INVENTOR.
HOMER M. HARVEY
BY
Lyon & Lyon
ATTORNEYS

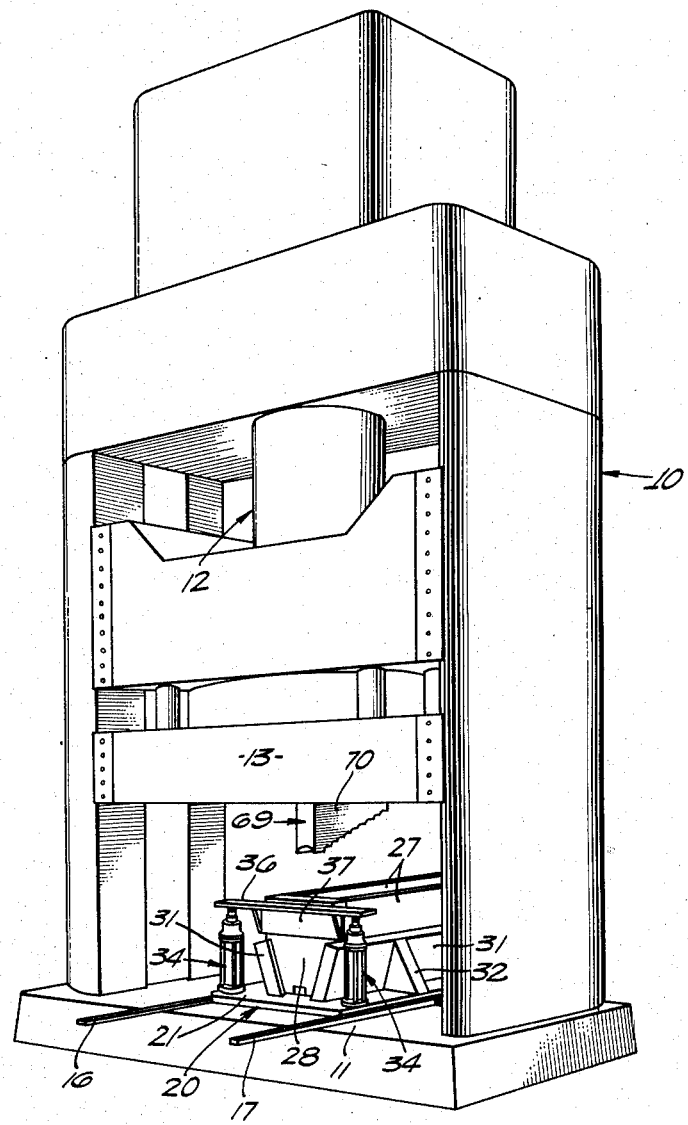

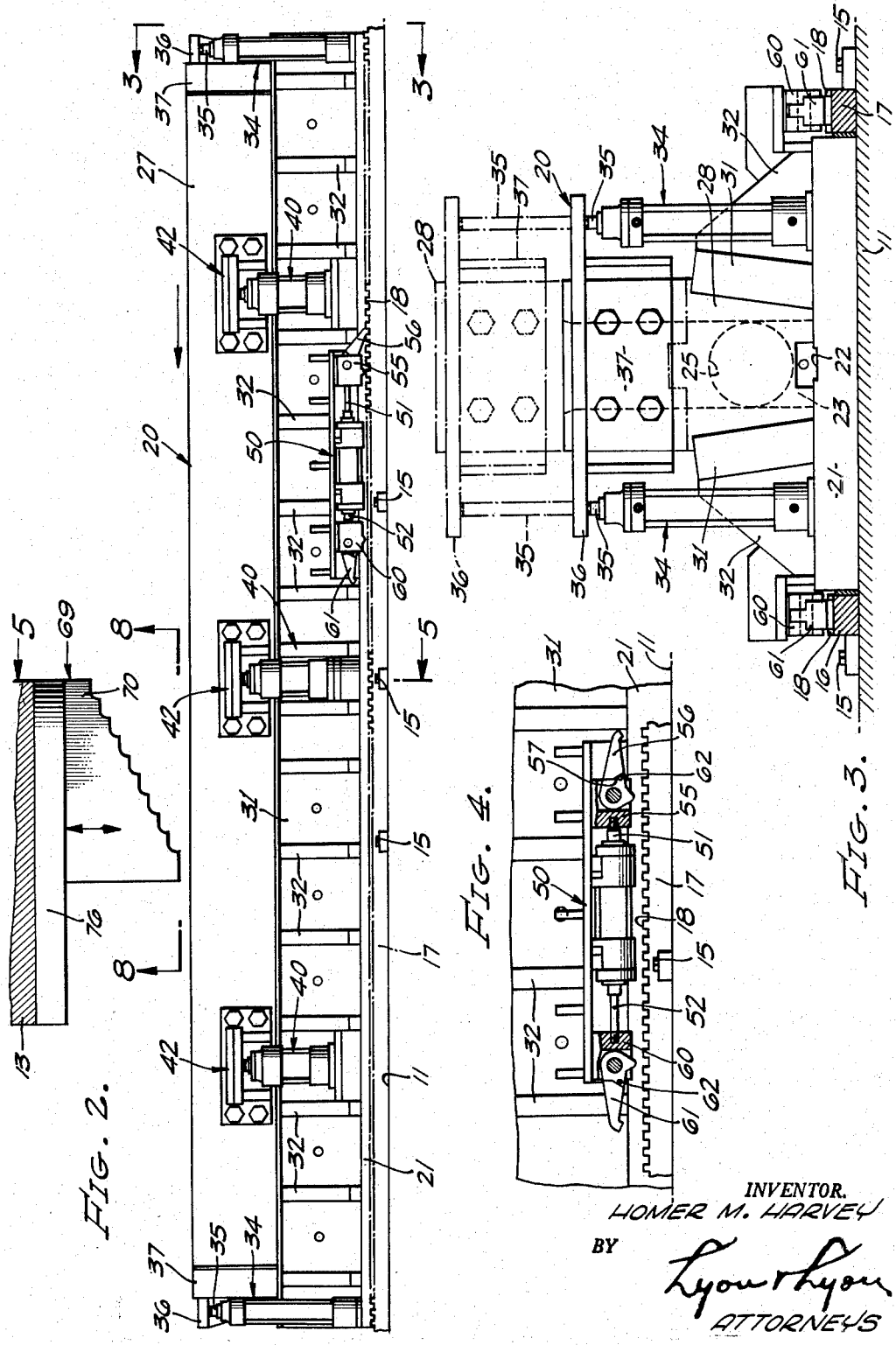

INVENTOR.
HOMER M. HARVEY
BY Lyon & Lyon
ATTORNEYS

July 14, 1959   H. M. HARVEY   2,894,282
APPARATUS FOR MAKING ELECTRODE STICKS
Filed Feb. 25, 1957   6 Sheets-Sheet 5

INVENTOR.
HOMER M. HARVEY
BY
Lyon & Lyon
ATTORNEYS

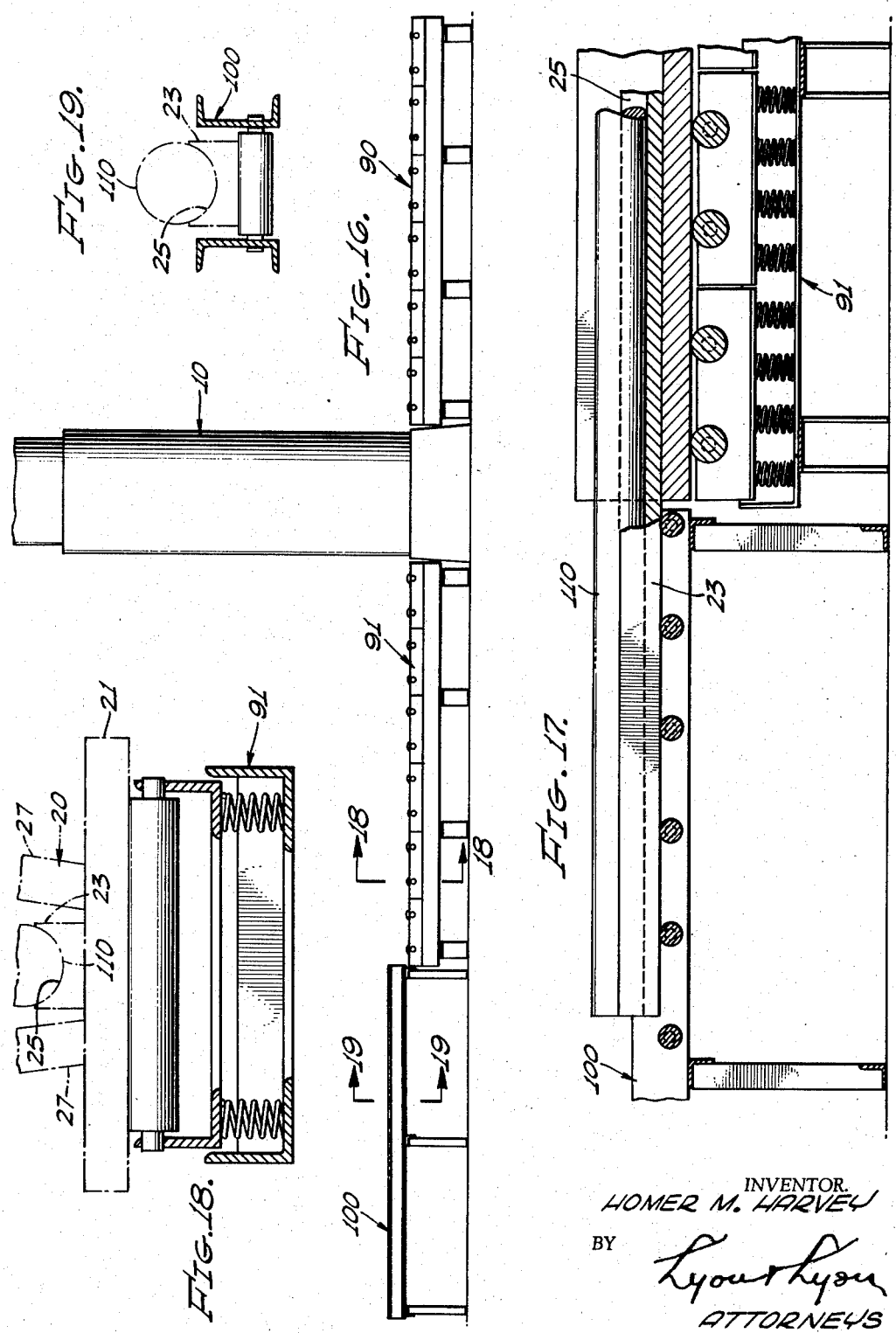

United States Patent Office 2,894,282
Patented July 14, 1959

2,894,282
APPARATUS FOR MAKING ELECTRODE STICKS
Homer M. Harvey, Los Angeles, Calif.
Application February 25, 1957, Serial No. 641,952
7 Claims. (Cl. 18—16)

This invention relates generally to the production of ingots of titanium, zirconium and other difficultly reducible refractory metals by arc welding of compacted electrodes of the metals, and has particular reference to the production of such compacted electrodes in stick form from sponge or powder of such metals.

One of the principal objects of this invention is to provide a novel apparatus for the production of consumable electrode sticks of substantial length from difficultly reducible metals such as titanium in sponge or powdered form.

A further object of this invention is to provide an apparatus wherein moderate total pressures are utilized, for compacting metals such as titanium in sponge or powdered form into long electrodes of substantially uniform cross section and density.

Refractory metals such as titanium and zirconium are difficult to reduce to usable form and hence are conventionally made into ingots by feeding a stick-like consumable electrode of a compacted sponge or powder to an electric arc furnace. These electrodes must be compacted into a very dense form so tightly compacted as to safely permit vertical suspension of the electrodes from the extreme upper portions thereof during the arc melting operation.

It has been found that pressures of up to 40 tons per square inch are required to properly compact the electrode sticks. The production of sticks in a single pressing is not economically feasible, due to such extreme pressure requirements. For example, the production of a stick 6 inches square or round and 120 inches long would require a pressure of approximately 28,000 tons. Accordingly, heretofore it has been common practice to compact by single pressing small, relatively short rectangular sticks and to thereafter assemble these into a large electrode of the required size by welding a plurality of the sticks together. For example, a 1500 ton press can be used to compact in a single pressing a 3-inch-square stick 10 inches long. By repeated pressings, 48 of these sticks could be produced and then welded into a single stick 6 inches square and 120 inches long. Such procedures are expensive and time-consuming and, additionally, they present a danger of contamination of the metal forming the sticks. An important object of the present invention is, therefore, to provide an apparatus for producing electrode sticks which is not subject to these and other disadvantages of the prior art.

Another, more specific, object of the present invention is to provide an apparatus which permits the use of a 1500 ton press in the production of 6-inch-square or round compacted metal electrodes of any desired predetermined length.

Other objects and advantages of this invention, it is believed, will be readily apparent from the following detailed description of preferred embodiments thereof when read in connection with the accompanying drawings.

In the drawings:
Figure 1 is a perspective view illustrating a portion of the apparatus of this invention as installed in a conventional 1500 ton press.

Figure 2 is a side elevation of the pressing member and die portions of the apparatus.

Figure 3 is a sectional view taken substantially on the line 3—3 of Figure 2.

Figure 4 is a fragmentary side elevation, on an enlarged scale, illustrating details of the die advancing mechanism.

Figure 16 is a side elevation of the entire apparatus, including the press and the auxiliary loading and unloading conveyor devices.

Figure 17 is a fragmentary side elevation on an enlarged scale, illustrating details of the unloading conveyors.

Figure 18 is a sectional view taken substantially on the line 18—18 of Figure 16.

Figure 19 is a sectional view taken substantially on the line 19—19 of Figure 16.

Figure 5:
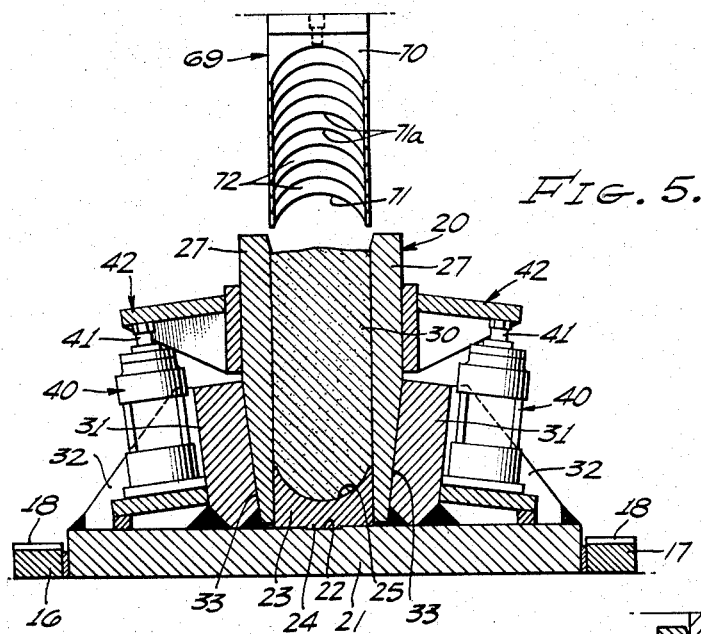
Figure 5 is a sectional elevation taken substantially on the line 5—5 of Figure 2.
Figure 6:
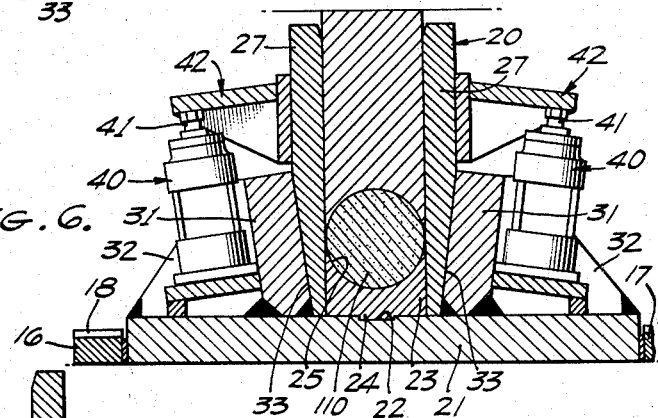
Figure 6 is a view similar to Figure 5, but illustrating the positions of the parts upon completion of the pressing operation.

Referring now to the drawings, the apparatus of this invention includes a conventional hydraulic press 10 of relatively small size such as one having a maximum force capability of 1500 tons. The press itself includes a bed or bolster plate 11, a power cylinder assembly 12 and a lower platen 13 adapted for vertical reciprocation by means of the power cylinder assembly. The details of construction of such a conventional press are well known to those skilled in the art and hence are not shown or described herein.

Mounted on the bolster plate 11 by means of holddown bolts 15 is a pair of parallel spaced rack or guide members 16 and 17, each provided with teeth 18 on the upper surfaces thereof. Interposed between the rack members and resting upon the bolster plate for sliding movement with respect thereto is a die assembly 20. This assembly includes a generally rectangular base plate 21 having a central longitudinal groove 22 in the upper surface thereof. Resting on the upper surface of the base plate in slideable relation therewith is a die member 23 which is provided with a central longitudinal tongue 24 on the lower face thereof seated in the groove 22, and with a longitudinal semi-cylindrical die cavity 25 on the upper surface thereof.

The die assembly 20 is provided with a pair of generally vertical side walls 27 and with a pair of end walls 28, these walls encompassing the die member 23 and extending a substantial distance upwardly from the die cavity so as to form an enlarged cavity for the reception of the sponge or powdered metal 30 to be compacted. Reinforcement of the side walls is provided by means of a pair of inclined beams 31, one welded to the base plate 21 on each side thereof, a plurality of gussets 32 being welded to the beams and base plate for further structural rigidity. The lower portions 33 of the outer surfaces of the side walls 27 are bevelled to mate with the inner inclined surfaces of the beams 31.

Means are provided for disassembly of the die assembly 20 and, as shown in the drawings, these means may include a pair of power cylinder assemblies 34, one pair secured to each end of the base plate 21. Each power cylinder assembly includes a vertically reciprocable piston rod 35, the rods of each pair of assemblies 34 being connected to a horizontal cross-bar 36 which, in turn, is secured to a vertical plate 37, each plate being bolted to one of the end walls 28. Similarly, a plurality of power cylinder assemblies 40 are provided for each of the side walls 27. Each of these power cylinder assemblies is secured to the base plate 21 at an angle, the angle of inclination of the piston rods 41 being parallel to the angle of inclination of the corresponding beams 31 and the bevelled portions 33 of the side walls. Each piston rod 41 is secured to a bracket member 42, each bracket member being, in turn, bolted to appropriate side walls 27.

Means are provided for longitudinal reciprocation of the die assembly 20 upon the press bolster plate 11 and, as shown in the drawings, these means may include an advancing mechanism including a pair of double-acting power cylinder assemblies 50, one secured to each of the beams 31. Each power cylinder assembly 50 includes a pair of piston rods 51 and 52, one at each end thereof. To the end of the piston rod 51 is secured a bracket member 55 to which is pivoted a pawl member 56. The pawl member is provided with a shoulder portion 57 which acts as a stop against the end of the bracket member 55 when the pawl member is engaged with the teeth of the rack member 16, as shown in Figure 2. The piston rod 52 is provided with a bracket member 60 and a pawl member 61 identical to those described above. Each pawl member is provided with an aperture 62 through which a pin may be inserted to maintain the pawl members in the inoperative position shown in Figure 4.

Mounted on the lower press platen 13 is the pressing member assembly 69 which includes the pressing member 70. This member comprises a block having a plurality of stepped die faces 71 and 71a, each of which is generally semi-circular in cross-section, the lowermost step 71 being about 1½ times as long as the remaining steps 71a. Another important feature of the pressing member design is that the riser portions 72 are arcuate in vertical section, i.e., concavely curved, as best shown in Figures 12–15.

The pressing member is secured to a rotatable disk 75 which is rotatably secured to the lower platen 13 by means of a retainer ring 76 which, in turn, is secured to the platen by means of bolts 76a. A bearing ring 77 of L-shaped cross-section is secured to the retainer ring 76 by means of screw members 78 and is interposed between the disk 75 and the ring 76. Means are provided for locking the disk 75 and the pressing member in one of two positions relative to the platen and, as shown in the drawings, these means may include a key member 80 having an end portion 81 insertable into one of two recesses 82 formed in the disk member 75. The end portion 81 is secured to a rod 82a which extends through an aperture 83 in a plate 84 bolted to the ring 76, the exterior end of the rod being provided with a handle 85. A helical spring 86 encircles the rod between the end portion 81 and the plate 84, normally maintaining the end portion in position in the recess 82.

Means are provided for loading the die assembly 20 into position in the press and for unloading the same from the press. As shown in Figures 16–19, these means include a loading conveyor 90 and an unloading conveyor 91. Both of these conveyors are identical, being of the spring-loaded, roller type as shown in Figures 17 and 18. An auxiliary conveyor 100 is aligned with the unloading conveyor 91 for the reception of the finished electrode stick, as will be described hereinafter.

In use of the apparatus, a charge of metal such as titanium sponge 30 is introduced into the cavity of the die assembly 20 and the die assembly loaded into position in the press 10 by means of the conveyor 90. As shown in Figure 1, the die assembly is aligned beneath the pressing member assembly 69 so that the step 71 will, upon lowering of the pressing member into the die cavity, first contact the most forward portion of the sponge 30.

Figure 8:
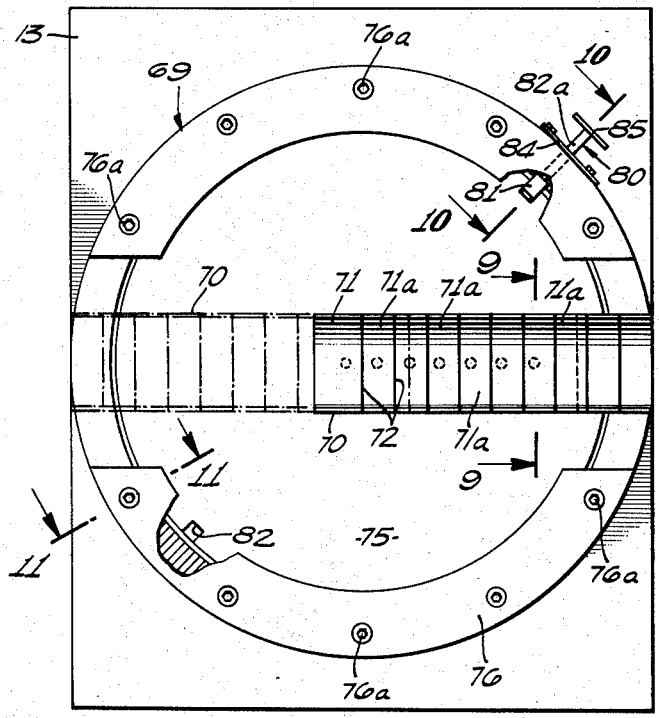
Figure 8 is a sectional elevation taken substantially on the line 8—8 of Figure 2.
Figure 9:
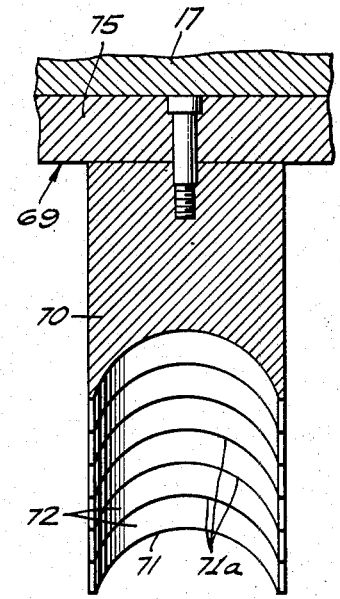
Figure 9 is a sectional elevation taken substantially on the line 9—9 of Figure 8.
Figure 10:
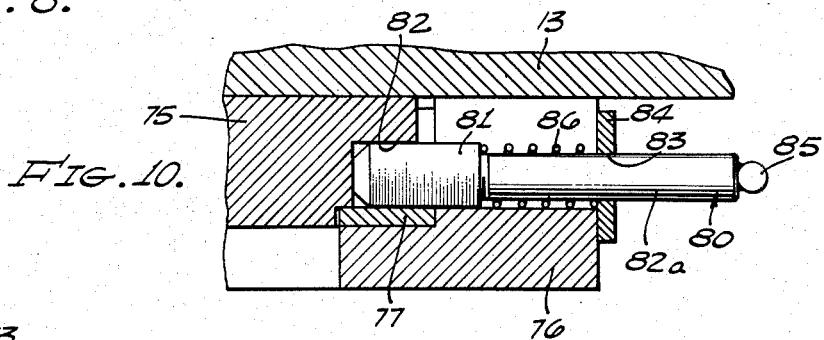
Figure 10 is a sectional view taken substantially on the line 10—10 of Figure 8.
Figure 11:
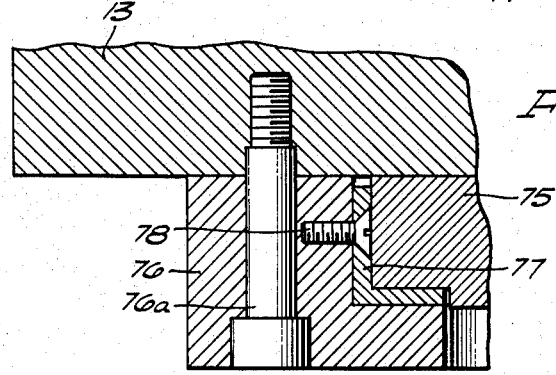
Figure 11 is a sectional elevation taken substantially on the line 11—11 of Figure 8.
Figure 12:
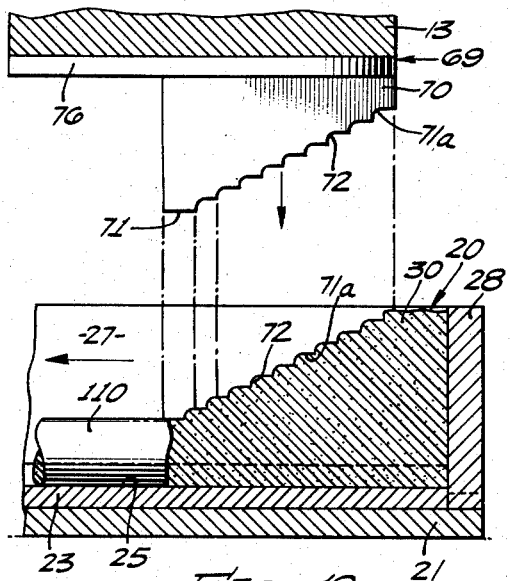
Figures 12, 13 and 14 are diagrammatic side sectional views illustrating the sequence of pressing operations.
Figure 14:
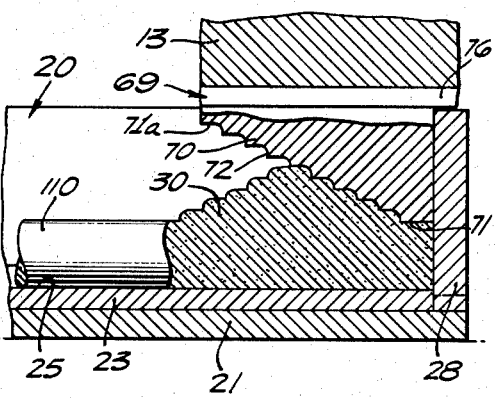
Figure 13:
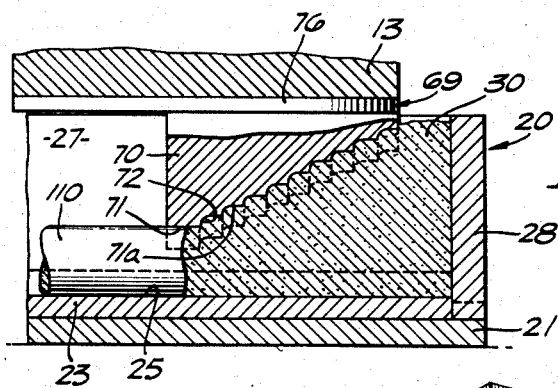
Figure 15:
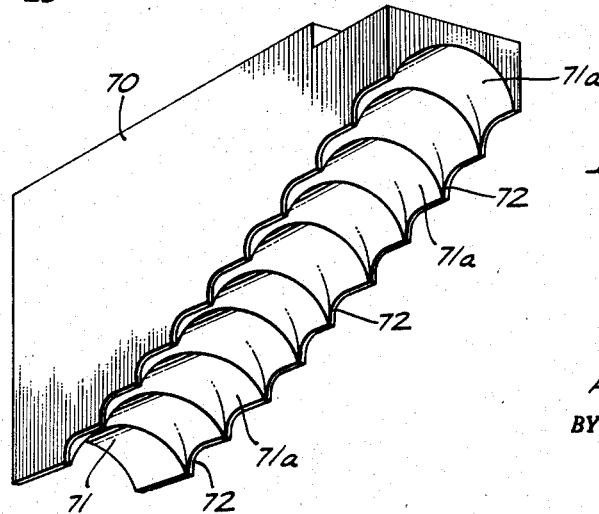
Figure 15 is a perspective view of the pressing member.

Upon such proper initial positioning of the die assembly, the pin is removed from the aperture 62 to release the pawl 56. The press 10 is then energized to cause the pressing member 70 to be reciprocated into and out of the die cavity. With each stroke of the pressing member, the power cylinder assembly 50 is actuated to advance the die assembly 20 in the direction of the arrow of Figure 2, the advance taking place while the pressing member is in the raised position. The distance of advance is substantially equal to the horizontal length of the steps 71a, but less than the length of the lowermost step 71. It will thus be understood that successive portions of the metal sponge are successively compacted by the steps 71a and finally compacted by the step 71 to produce the final compacted stick 110. Moreover, by virtue of the increased length of the step 71, the successively compacted portions of the sponge are overlapped with each contact by the step 71. This sequence of operations is continued as shown in Figures 12 and 13 until the pressing member reaches the rearward end of the die assembly cavity, whereupon the pressing member and plate 75 are rotated from the position shown in Figure 12 to that shown in Figure 14 (and by the phantom lines of Figure 8) and locked therein by means of the key member 80.

The die assembly is then advanced in the opposite direction in synchronism with the reciprocation of the pressing member to complete the compacting of the metal sponge. This reversal of the direction of advance of the die assembly is accomplished merely by removing the pin in the aperture 62 of the pawl 61 and inserting the pin in the aperture of the pawl 56, and then energizing the power cylinder assembly 50.

Figure 7:
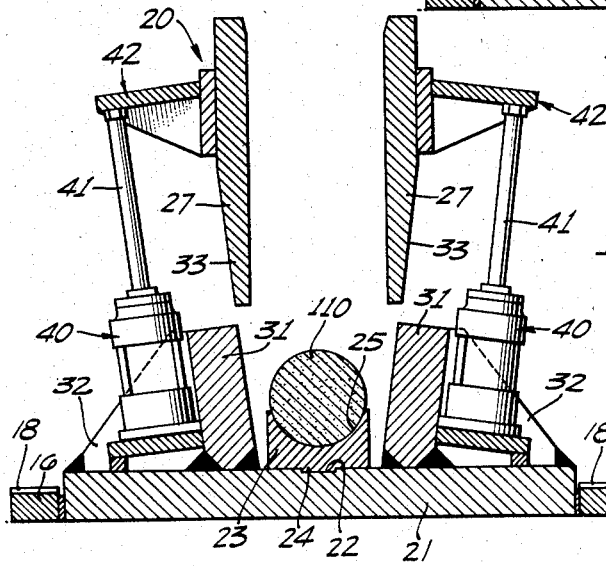
Figure 7 is a view similar to Figure 5, but illustrating the positions of the parts upon disassembly of the die for removal of the finished electrode stick.

Upon the completion of the pressing operation, the die assembly is moved onto the unloading conveyor 91. The power cylinder assemblies 40 and 32 are then energized to disassemble the die assembly, as shown in Figure 7 and by the phantom lines of Figure 18. The die member 23 and the finished electrode stick 110 are then free to be moved onto the conveyor 100 as indicated by the phantom lines of Figure 19.

From the above description it will be understood that a process and apparatus capable of producing electrode sticks of uniform cross-section and density has been provided. Moreover, the invention permits the use of a press of relatively low total force capability inasmuch as the area of the final compacting portion or step of the pressing member is relatively small. The curved configuration of the step risers is important in that it tends to prevent crowding or displacement of the loose sponge particles while minimizing longitudinal thrust on the pressing member itself during the operation thereof.

Having fully described my invention, it is to be understood that I do not wish to be limited to the details set forth, but my invention is of the full scope of the appended claims.

I claim:

1. In apparatus for producing electrode sticks from metal in sponge, powder and like forms, the combination of a press including a bed and a power cylinder assembly having a vertically reciprocable platen, a pressing member carried on said platen, said pressing member having a plurality of stepped faces thereon, the risers between said stepped faces being concavely curved, a die assembly on said bed, said die assembly having an elongated cavity, and means for horizontally advancing said assembly to present successive longitudinal portions of said cavity to said pressing member.

2. In apparatus for producing electrode sticks from metal in sponge, powder and like forms, the combination of a press including a bed and a power cylinder assembly having a vertically reciprocable platen, a pressing member carried on said platen, said pressing member having a plurality of stepped faces thereon, the lowermost of said stepped faces being appreciably longer than the remaining stepped faces, the risers between said stepped faces being concavely curved, a die assembly on said bed, said die assembly having an elongated cavity, and means for horizontally and intermittently advancing said assembly a distance less than the length of said lowermost stepped face in timed relation with the reciprocation of said platen and the pressing member carried thereby to present successive longitudinal portions of said cavity to said pressing member.

3. In apparatus for producing electrode sticks from metal in sponge, powder and like forms, the combination of a press including a bed and a power cylinder assembly having a vertically reciprocable platen, a pressing member carried on said platen, said pressing member having a plurality of stepped faces thereon, a die assembly on said bed, said die assembly having an elongated cavity, means for horizontally advancing said assembly in one direction to present successive longitudinal portions of said cavity to said pressing member, means for reversing the direction of advancement of said die assembly, and means for reversing the longitudinal position of said pressing member with respect to said die assembly.

4. In apparatus for producing electrode sticks from metal in sponge, powder and like forms, the combination of a press including a bed and a power cylinder assembly having a vertically reciprocable platen, a pressing member carried on said platen, said pressing member having a plurality of stepped faces thereon, the lowermost of said stepped faces being appreciably longer than the remaining stepped faces, a die assembly on said bed, said die assembly having an elongated cavity, means for horizontally and intermittently advancing said assembly in one direction a distance less than the length of said lowermost stepped face in timed relation with the reciprocation of said platen and the pressing member carried thereby to present successive longitudinal portions of said cavity to said pressing member, means for reversing the direction of advancement of said die assembly, and means for reversing the longitudinal position of said pressing member with respect to said die assembly.

5. In apparatus for producing electrode sticks from metal in sponge, powder and like forms, the combination of a press including a bed and a power cylinder assembly having a veritcally reciprocable platen, a pressing member carried on said platen, said pressing member having a plurality of stepped faces thereon, the lowermost of said stepped faces being appreciably longer than the remaining stepped faces, the risers between said stepped faces being concavely curved, a die assembly on said bed, said die assembly having an elongated cavity, means for horizontally and intermittently advancing said assembly in one direction a distance less than the length of said lowermost stepped face in timed relation with the reciprocation of said platen and the pressing member carried thereby to present successive longitudinal portions of said cavity to said pressing member, means for reversing the direction of advancement of said die assembly, and means for reversing the longitudinal position of said pressing member with respect to said die assembly.

6. In apparatus for producing electrode sticks from metal in sponge, powder and like forms, the combination of a press including a bed and a power cylinder assembly having a vertically reciprocable platen, a pressing member carried on said platen, said pressing member having a plurality of stepped faces thereon, the lowermost of said stepped faces being appreciably longer than the remaining stepped faces, the risers between said stepped faces being concavely curved, a die assembly on said bed, said die assembly having an elongated cavity, means for horizontally and intermittently advancing said assembly in one direction a distance less than the length of said lowermost stepped face in timed relation with the reciprocation of said platen and the pressing member carried thereby to present successive longitudinal portions of said cavity to said pressing member, means for reversing the direction of advancement of said die assembly, means for reversing the longitudinal position of said pressing member with respect to said die assembly, and means for disassembling said die assembly for removal of the completed electrode sticks.

7. In apparatus for producing electrode sticks from metal in sponge, powder and like forms, the combination of a press including a bed and a power cylinder assembly having a vertically reciprocable platen, a pressing member carried on said platen, said pressing member having a plurality of steppd faces thereon, the risers between said stepped faces being concavely curved a die assembly on said bed, said die assembly having side and end walls forming an elongated cavity, means for horizontally advancing said assembly to present successive longitudinal portions of said cavity to said pressing member, and means for disassembling said die assembly for removal of the completed electrode sticks, said means including power cylinder assemblies operable to bring about relative separation of said side and end walls.

References Cited in the file of this patent

UNITED STATES PATENTS

| | | |
|---|---|---|
| 1,326,614 | Pfanstiehl | Dec. 30, 1919 |
| 1,352,160 | Willard | Sept. 7, 1920 |
| 2,708,770 | Herres et al. | May 24, 1955 |
| 2,784,453 | Hjulian | Mar. 12, 1957 |